United States Patent
Marcin, Jr. et al.

(10) Patent No.: US 10,287,896 B2
(45) Date of Patent: May 14, 2019

(54) TURBINE BLADES AND MANUFACTURE METHODS

(71) Applicant: United Technologies Corporation, Hartford, CT (US)

(72) Inventors: John J. Marcin, Jr., Marlborough, CT (US); Steven J. Bullied, Pomfret Center, CT (US); Dilip M. Shah, Glastonbury, CT (US); Alan D. Cetel, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 564 days.

(21) Appl. No.: 14/916,310

(22) PCT Filed: Aug. 13, 2014

(86) PCT No.: PCT/US2014/050810
§ 371 (c)(1),
(2) Date: Mar. 3, 2016

(87) PCT Pub. No.: WO2015/041775
PCT Pub. Date: Mar. 26, 2015

(65) Prior Publication Data
US 2016/0222801 A1    Aug. 4, 2016

Related U.S. Application Data
(60) Provisional application No. 61/878,894, filed on Sep. 17, 2013.

(51) Int. Cl.
*F01D 5/28*    (2006.01)
*F01D 5/14*    (2006.01)
(Continued)

(52) U.S. Cl.
CPC ........... *F01D 5/28* (2013.01); *B23K 20/02* (2013.01); *F01D 5/147* (2013.01);
(Continued)

(58) Field of Classification Search
None
See application file for complete search history.

(56) References Cited

U.S. PATENT DOCUMENTS 3,342,455 A * 9/1967 Fleck ............... B22D 27/045
164/125
3,494,709 A * 2/1970 Piearcey ........... B22D 27/045
416/232
(Continued)

FOREIGN PATENT DOCUMENTS

| DE | 102008025848 A1 | 12/2009 |
| DE | 102008058140 A1 | 5/2010 |

(Continued)

OTHER PUBLICATIONS

International Search Report and Written Opinion for PCT/US2014/050810, dated Nov. 19, 2014.
(Continued)

*Primary Examiner* — Eldon T Brockman
(74) *Attorney, Agent, or Firm* — Bachman & LaPointe, P.C.

(57) ABSTRACT

A blade (60; 60-2) comprises an airfoil (61) and an attachment root (63). The blade has a tipward zone (80; 80-2; 80-2, 81) and a rootward zone (82; 82-2, 81; 82). The rootward zone has a single crystal structure. The tipward zone has a single crystal structure. The crystalline orientations of the rootward zone and tipward zone are at least 15° out of registry with each other.

23 Claims, 7 Drawing Sheets

(51) Int. Cl.
*B23K 20/02* (2006.01)
*B23K 101/00* (2006.01)
*B23K 103/08* (2006.01)

(52) U.S. Cl.
CPC .... *B23K 2101/001* (2018.08); *B23K 2103/08* (2018.08); *F05D 2220/32* (2013.01); *F05D 2230/236* (2013.01); *F05D 2240/307* (2013.01); *F05D 2300/175* (2013.01); *F05D 2300/607* (2013.01)

(56) References Cited

U.S. PATENT DOCUMENTS

| | | | | |
|---|---|---|---|---|
| 3,572,419 | A * | 3/1971 | Barrow | B22D 27/045 164/122.2 |
| 3,753,794 | A * | 8/1973 | Paulonis | B23K 35/004 428/607 |
| 3,790,303 | A * | 2/1974 | Endres | F01D 5/28 164/122.1 |
| 4,033,792 | A | 7/1977 | Giamei et al. | |
| 4,184,900 | A * | 1/1980 | Erickson | B22D 27/045 148/404 |
| 4,292,010 | A * | 9/1981 | Meetham | F01D 5/28 416/213 R |
| 4,345,950 | A * | 8/1982 | O'Hara | C22F 1/10 148/404 |
| 4,540,038 | A * | 9/1985 | Burke | B22D 27/045 164/499 |
| 4,550,764 | A * | 11/1985 | Horton | B22D 27/045 164/122.2 |
| 4,605,452 | A * | 8/1986 | Gemma | C30B 11/00 148/404 |
| 4,637,448 | A * | 1/1987 | Burke | B22D 27/045 164/122.2 |
| 4,700,881 | A * | 10/1987 | Ryan | B23K 35/004 228/194 |
| 4,714,101 | A * | 12/1987 | Terkelsen | C30B 11/14 164/122.2 |
| 5,061,154 | A * | 10/1991 | Kington | F01D 5/048 29/889 |
| 5,292,385 | A * | 3/1994 | Kington | F01D 5/02 148/404 |
| 5,318,406 | A | 6/1994 | Bardes | |
| 6,325,871 | B1 | 12/2001 | Burke et al. | |
| 6,331,217 | B1 | 12/2001 | Burke et al. | |
| 6,474,946 | B2 | 11/2002 | Kildea | |
| 6,508,000 | B2 | 1/2003 | Burke et al. | |
| 6,814,544 | B2 | 11/2004 | Tsukamoto et al. | |
| 7,334,993 | B2 | 2/2008 | Sekihara et al. | |
| 7,565,996 | B2 | 7/2009 | Das | |
| 7,690,112 | B2 * | 4/2010 | Bostanjoglo | B23P 15/04 29/889.7 |
| 7,762,309 | B2 | 7/2010 | Tamaddoni-Jahromi et al. | |
| 7,762,783 | B2 * | 7/2010 | Cairo | B23P 6/005 416/223 R |
| 7,967,565 | B1 | 6/2011 | Kimmel et al. | |
| 8,434,543 | B2 * | 5/2013 | Morris | F01D 5/284 164/122.1 |
| 8,876,471 | B2 * | 11/2014 | Morris | F01D 5/284 148/404 |
| 2002/0148115 | A1 | 10/2002 | Burke et al. | |
| 2009/0208769 | A1 | 8/2009 | Verner et al. | |
| 2010/0135812 | A1 * | 6/2010 | Cairo | B23P 6/005 416/223 A |
| 2011/0299999 | A1 | 12/2011 | James | |
| 2014/0044991 | A1 | 2/2014 | Bruck | |

FOREIGN PATENT DOCUMENTS

| | | |
|---|---|---|
| EP | 2586969 A2 | 5/2013 |
| JP | 2000-263247 A | 9/2000 |

OTHER PUBLICATIONS

European Search Report dated May 17, 2017 for European Patent Application No. 14845908.4.

* cited by examiner

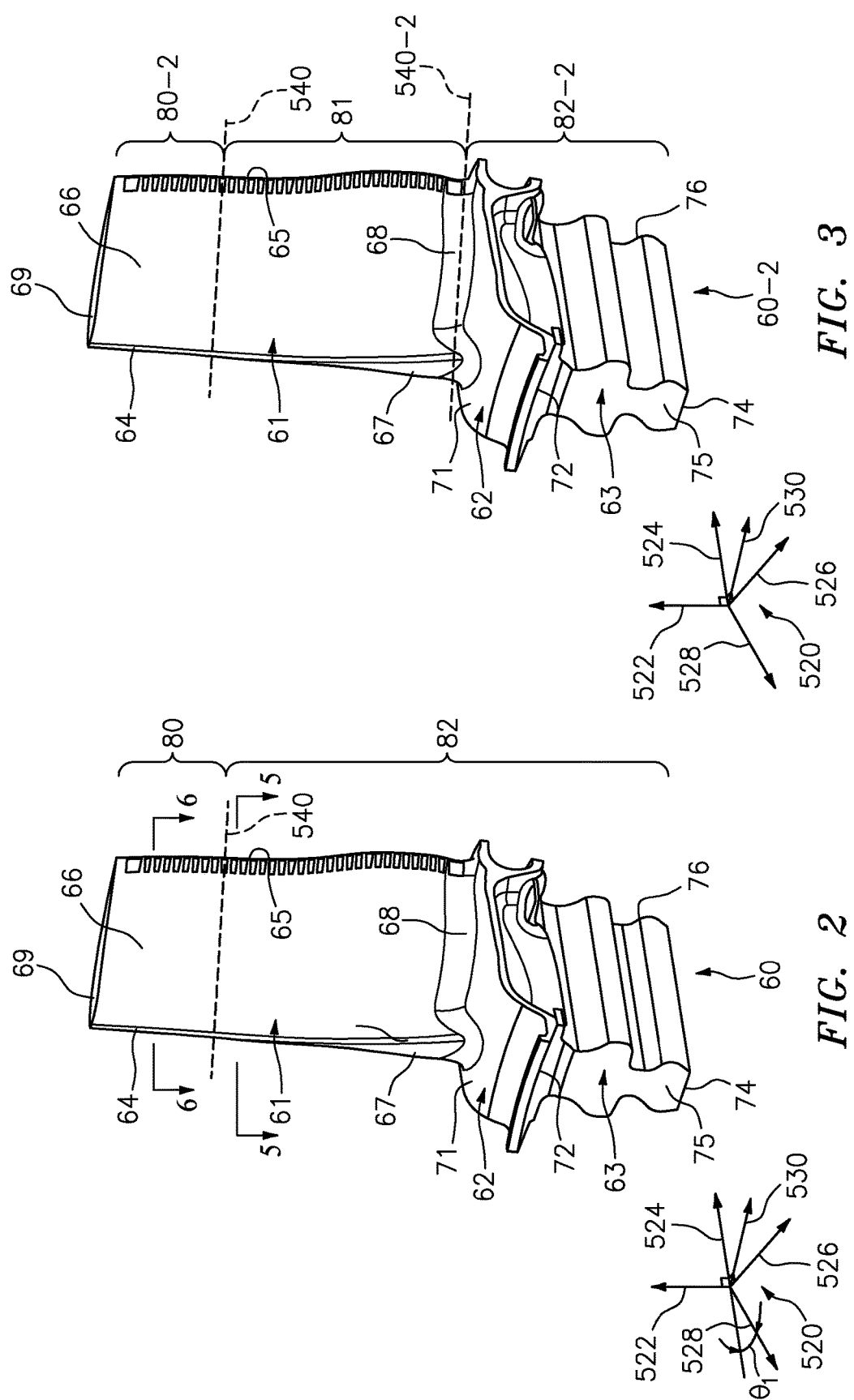

TURBINE BLADES AND MANUFACTURE METHODS

CROSS REFERENCE TO RELATED APPLICATION

Benefit is claimed of U.S. Patent Application Ser. No. 61/878,894, filed Sep. 17, 2013, and entitled "Turbine Blades and Manufacture Methods", the disclosure of which is incorporated by reference herein in its entirety as if set forth at length.

BACKGROUND

The disclosure relates to gas turbine engines. More particularly, the disclosure relates to turbine blades.

FIG. 1 schematically illustrates a gas turbine engine 20. The exemplary gas turbine engine 20 is a two-spool turbofan having a centerline (central longitudinal axis) 500, a fan section 22, a compressor section 24, a combustor section 26 and a turbine section 28. Alternative engines might include an augmentor section (not shown) among other systems or features. The fan section 22 drives air along a bypass flowpath 502 while the compressor section 24 drives air along a core flowpath 504 for compression and communication into the combustor section 26 then expansion through the turbine section 28. Although depicted as a turbofan gas turbine engine in the disclosed non-limiting embodiment, it is to be understood that the concepts described herein are not limited to use with turbofan engines and the teachings can be applied to non-engine components or other types of turbomachines, including three-spool architectures and turbines that do not have a fan section.

The engine 20 includes a first spool 30 and a second spool 32 mounted for rotation about the centerline 500 relative to an engine static structure 36 via several bearing systems 38. It should be understood that various bearing systems 38 at various locations may alternatively or additionally be provided.

The first spool 30 includes a first shaft 40 that interconnects a fan 42, a first compressor 44 and a first turbine 46. The first shaft 40 is connected to the fan 42 through a gear assembly of a fan drive gear system (transmission) 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. A combustor 56 (e.g., an annular combustor) is between the second compressor 52 and the second turbine 54 along the core flowpath. The first shaft 40 and the second shaft 50 are concentric and rotate via bearing systems 38 about the centerline 500.

The core airflow is compressed by the first compressor 44 then the second compressor 52, mixed and burned with fuel in the combustor 56, then expanded over the second turbine 54 and first turbine 46. The first turbine 46 and the second turbine 54 rotationally drive, respectively, the first spool 30 and the second spool 32 in response to the expansion.

U.S. Pat. No. 6,331,217 shows a single-crystal airfoil transient liquid phase (TLP) bonded to a polycrystalline root. U.S. Pat. No. 7,762,309 shows casting of a blade having a single-crystal root and a columnar airfoil.

SUMMARY

One aspect of the disclosure involves a blade comprising an airfoil and an attachment root. The blade has a tipward zone and a rootward zone. The rootward zone has a single crystal structure. The tipward zone has a single crystal structure. The crystalline orientations of the rootward zone and tipward zone are at least 15° out of registry with each other.

A further embodiment may additionally and/or alternatively include the crystalline orientations of the rootward zone and tipward zone being at least 30° out of registry with each other.

A further embodiment may additionally and/or alternatively include a transient liquid phase bond between the tipward zone and the rootward zone.

A further embodiment may additionally and/or alternatively include the tipward zone having a first composition and the rootward zone having a second composition, different from the first composition.

A further embodiment may additionally and/or alternatively include the tipward zone having a first crystalline direction within 15° of spanwise and the rootward zone having a second crystalline direction, different from the first crystalline direction, within 15° of spanwise.

A further embodiment may additionally and/or alternatively include the first crystalline direction being a <111> direction and the second crystalline direction being a <001> direction.

A further embodiment may additionally and/or alternatively include the tipward zone having a first crystalline direction within 15° of spanwise. The rootward zone has said first crystalline direction within 15° of spanwise. At an interface between the tipward zone and the rootward zone, the crystal of the tipward zone is rotated around the spanwise direction by an angle of 15-45° relative to the crystal of the rootward zone.

A further embodiment may additionally and/or alternatively include the first crystalline direction being a <001> direction.

A further embodiment may additionally and/or alternatively include the tipward zone being less dense than the rootward zone.

A further embodiment may additionally and/or alternatively include the tipward zone and the rootward zone having the same composition.

A further embodiment may additionally and/or alternatively include the tipward zone and the rootward zone having differing compositions.

A further embodiment may additionally and/or alternatively include the tipward zone and the rootward zone being nickel-based superalloy.

Another aspect of the disclosure involves a method for manufacturing a blade comprising: an airfoil; and attachment root, wherein: the blade has a tipward zone and a rootward zone. The method comprises: assembling a precursor of the tipward zone and a precursor of the rootward zone with a foil therebetween; and heating the assembled precursors and foil to transient liquid phase bond the tipward zone and the rootward zone.

A further embodiment may additionally and/or alternatively include the rootward zone having a single crystal structure and the tipward zone having a single crystal structure.

A further embodiment may additionally and/or alternatively include the crystalline orientations of the rootward zone and tipward zone being at least 15° out of registry with each other.

A further embodiment may additionally and/or alternatively include the tipward zone having a <111> direction within 15° of spanwise and the rootward zone having a <001> direction within 15° of spanwise.

A further embodiment may additionally and/or alternatively include the tipward zone being of a different alloy than the rootward zone.

A further embodiment may additionally and/or alternatively include the tipward zone being of a less dense alloy than the rootward zone.

A further embodiment may additionally and/or alternatively include a boundary between the tipward zone and the rootward zone being between −10% and 70% span of the airfoil.

A further embodiment may additionally and/or alternatively include the foil having a by-weight concentration of a melting point depressant at least 1.0% greater than the precursor of the first zone and the precursor of the second zone.

A further embodiment may additionally and/or alternatively include the precursor of the tipward zone and the precursor of the rootward zone being nickel-based superalloy and the melting point depressant being boron.

A further embodiment may additionally and/or alternatively include the foil having a thickness of twenty micrometers to 100 micrometers.

Another aspect of the disclosure involves a blade comprising an airfoil and an attachment root. The blade has a tipward zone, a rootward zone, and a transient liquid phase bond between the tipward zone and the rootward zone.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a view of a turbine blade of the engine of FIG. 1.

FIG. 3 is a view of an alternative turbine blade of the engine of FIG. 1.

Like reference numbers and designations in the various drawings indicate like elements.

DETAILED DESCRIPTION

Figure 1:
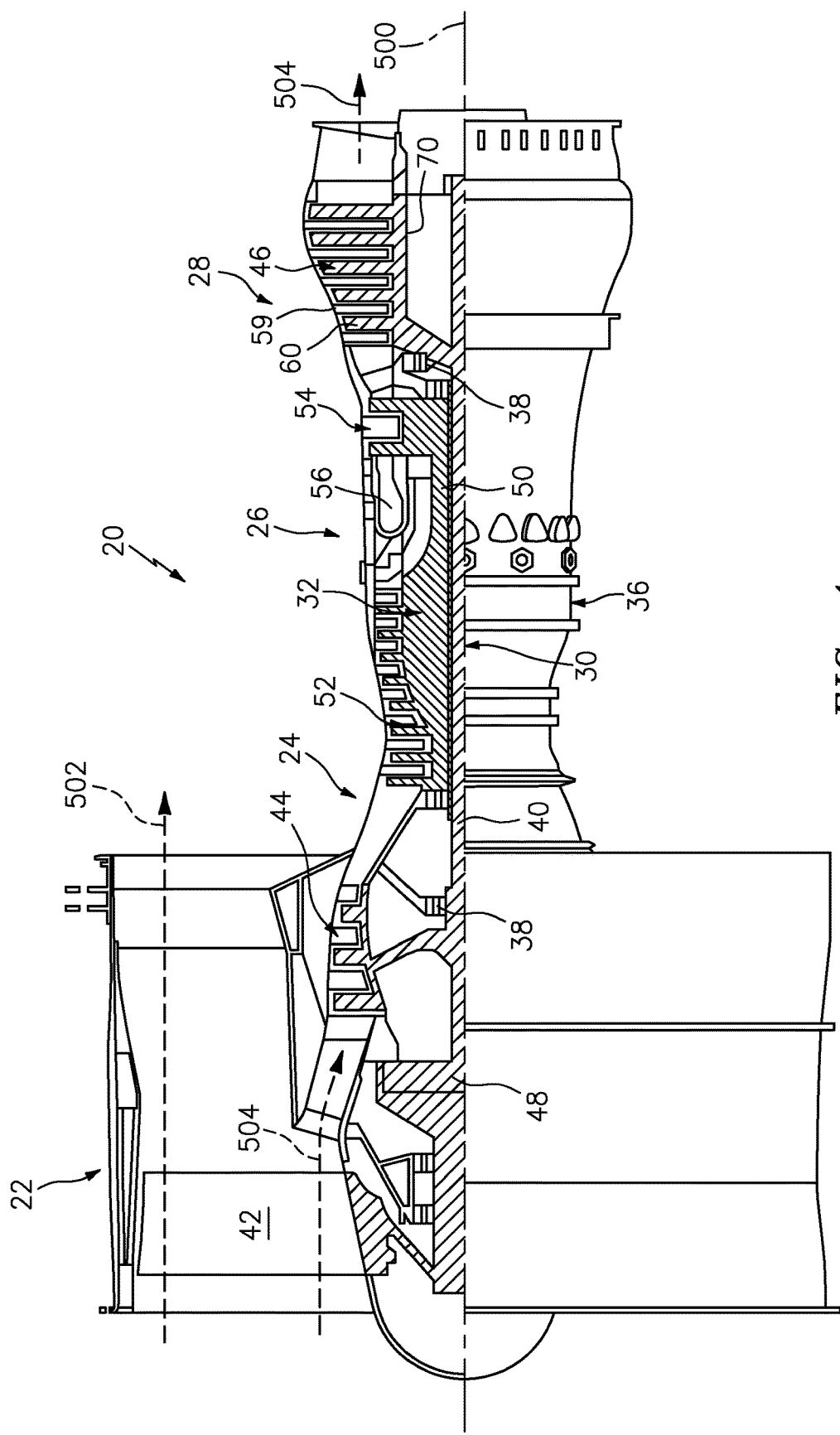
FIG. 1 is a partially schematic half-sectional view of a gas turbine engine.

The engine 20 includes many components that are or can be fabricated of metallic materials, such as aluminum alloys and superalloys. As an example, the engine 20 includes rotatable blades 60 and static vanes 59 in the turbine section 28. The blades 60 and vanes 59 can be fabricated of superalloy materials, such as cobalt- or nickel-based alloys. The blade 60 (FIG. 2) includes an airfoil 61 that projects outwardly from a platform 62. A root portion 63 (e.g., having a "fir tree" profile) extends inwardly from the platform 62 and serves as an attachment for mounting the blade in a complementary slot on a disk 70 (shown schematically in FIG. 1). The airfoil 61 extends streamwise from a leading edge 64 to a trailing edge 65 and has a pressure side 66 and a suction side 67. The airfoil extends spanwise from and inboard end 68 at the outer diameter (OD) surface 71 of the platform 62 to a distal/outboard tip 69 (shown as a free tip rather than a shrouded tip in this example).

The root 63 extends from an outboard end at an underside 72 of the platform to an inboard end 74 and has a forward face 75 and an aft face 76 which align with corresponding faces of the disk when installed.

The blade 60 has a body or substrate that has a hybrid composition and microstructure. For example, a "body" is a main or central foundational part, distinct from subordinate features, such as coatings or the like that are supported by the underlying body and depend primarily on the shape of the underlying body for their own shape. As can be appreciated however, although the examples and potential benefits may be described herein with respect to the blades 60, the examples can also be extended to the vanes 59, disk 70, other rotatable metallic components of the engine 20, non-rotatable metallic components of the engine 20, or metallic non-engine components.

The blade 60 has a tipward first section 80 fabricated of a first material and a rootward second section 82 fabricated of a second, different material. A boundary between the sections is shown as 540. For example, the first and second materials differ in at least one of composition, microstructure and mechanical properties. In a further example, the first and second materials differ in at least density. In one example, the first material (near the tip of the blade 60) has a relatively low density and the second material has a relatively higher density. The first and second materials can additionally or alternatively differ in other characteristics, such as corrosion resistance, strength, creep resistance, fatigue resistance or the like.

In this example, the sections 80/82 each include portions of the airfoil 61. Alternatively, or in addition to the sections 80/82, the blade 60 can have other sections, such as the platform 62 and the root portion 63, which may be independently fabricated of third or further materials that differ in at least one of composition, microstructure and mechanical properties from each other and, optionally, also differ from the sections 80/82 in at least one of composition, microstructure, and mechanical properties.

In this example, the airfoil 61 extends over a span from 0% span at the platform 62 to a 100% span at the tip 69. The section 82 extends from the 0% span to X % span and the section 80 extends from the X % span to the 100% span. In one example, the X % span is, or is approximately, 70% such that the section 80 extends from 70% to 100% span. In other examples, the X % can be anywhere from −20%-99%, more particularly, −10% to 80% or −10% to 80% or 10% to 80%. In a further example, the densities of the first and second materials differ by at least 3%. In a further example, the densities differ by at least 6%, and in one example differ by 6%-10%. As is discussed further below, the X % span location and boundary 540 may represent the center of a short transition region between sections of the two pure first and second materials.

The first and second materials of the respective sections 80/82 can be selected to locally tailor the performance of the blade 60. For example, the first and second materials can be selected according to local conditions and requirements for corrosion resistance, strength, creep resistance, fatigue resistance or the like. Further, various benefits can be achieved by locally tailoring the materials. For instance, depending on a desired purpose or objective, the materials can be tailored to reduce cost, to enhance performance, to reduce weight or a combination thereof.

FIG. 3 divides the blade 60-2 into three zones (a tipward Zone 1 numbered 80-2; a rootward Zone 2 numbered 82-2; and an intermediate Zone 3 numbered 81) which may be of two or three different alloys (plus transitions). Desired relative alloy properties for each zone are:

Zone 1 Airfoil Tip: low density (desirable because this zone imposes centrifugal loads on the other zones) and high oxidation resistance. This may also include a tip shroud (not shown);

Zone 2 Root & Fir Tree: high notched LCF strength, high stress corrosion cracking (SCC) resistance, low density (low density being desirable because these areas provide a large fraction of total mass);

Zone 3 Lower Airfoil: high creep strength (due to supporting centrifugal loads with a small cross-section), high oxidation resistance (due to gaspath exposure and heating), higher thermal-mechanical fatigue (TMF) capability/life.

Exemplary Zone ⅓ transition 540 is at 50-80% airfoil span, more particularly 55-75% or 60-70% (e.g., measured at the center of the airfoil section or at half chord). Exemplary Zone ⅔ transition 540-2 is at about 0% span (e.g., −5% to 5% or −10% to 10%).

Figure 4:
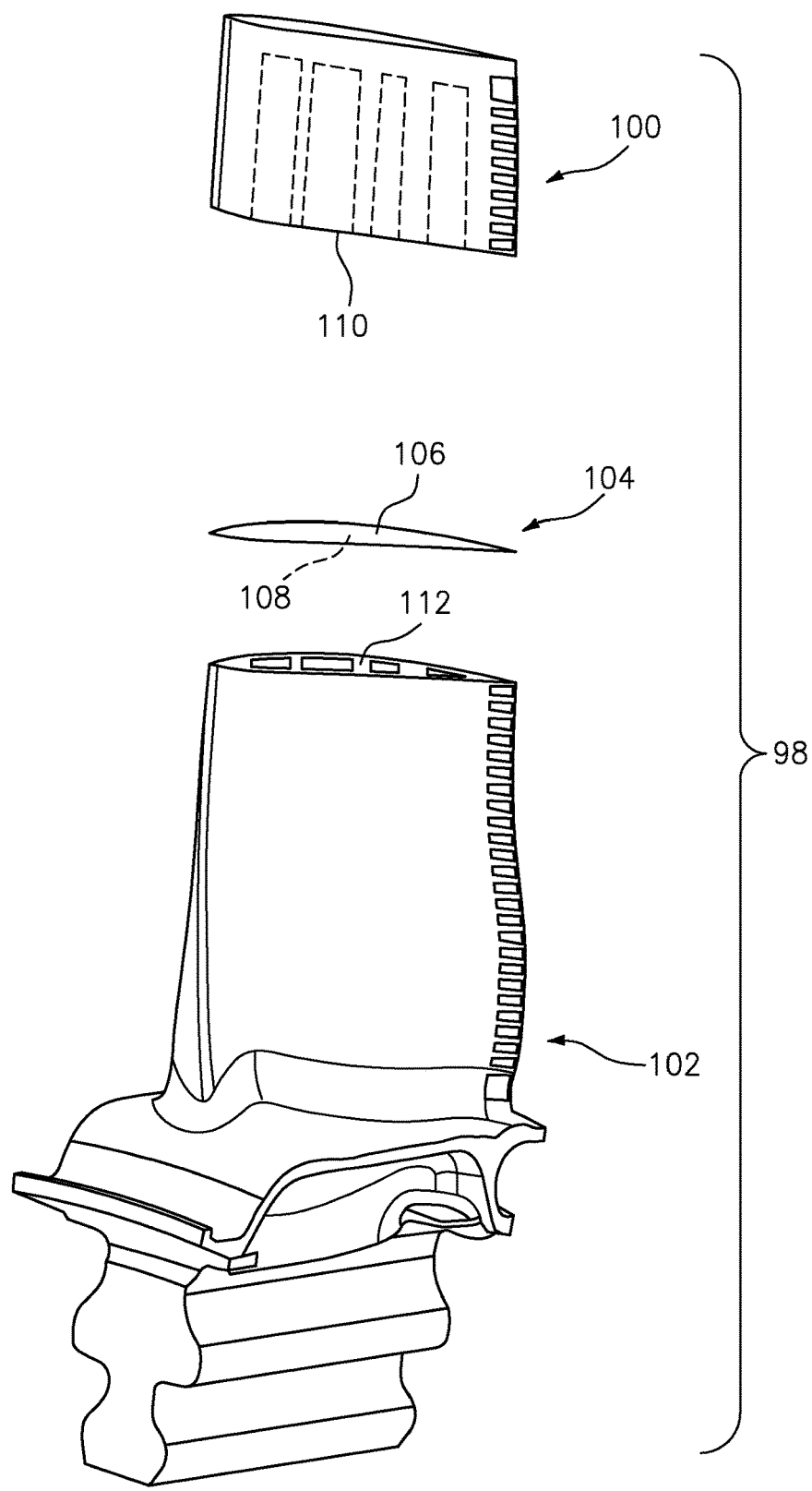
FIG. 4 is an exploded view of the turbine blade of FIG. 2 during manufacture.

FIG. 4 is an exploded view of a precursor 98 of the blade 60 of FIG. 2. The precursor 98 includes precursors 100 and 102 of the sections 80 and 82, respectively. The precursors 100 and 102 are separately cast (e.g., of differing compositions and/or differing crystallographic orientation). For example, the precursor 100 may be of a less dense material also having less strength due to the reduced loading it experiences relative to the precursor 102.

FIG. 4 further shows a foil 104 having faces 106 and 108 for transient liquid phase bonding (TLP) of the two sections 100 and 102. For bonding nickel-based superalloy precursors 100 and 102, the foil 104 may be a nickel-based alloy or superalloy having a quantity of melting point depressant (e.g., boron). Exemplary boron concentrations are 1% to 15% by weight, more particularly 1% to 3% by weight. These may be at least 0.5% higher than concentration of the depressant in the precursors, more particularly, at least 1.0% higher. Exemplary foil thicknesses are twenty micrometers to one hundred micrometers, more particularly, thirty micrometers to eighty micrometers.

The foil 104 is sandwiched between respective surfaces/faces 110 and 112 of the precursors 100 and 102 (e.g., in a fixture (not shown)) and the combination is heated.

FIG. 2 further shows a frame of reference 520 wherein a direction 522 is radially-outward or spanwise (also known as a stacking axis) along the airfoil, a direction 524 normal thereto is parallel to the sides of the attachment root and the third coordinate direction is shown as 526. In some examples where the disk slot is off longitudinal by an angle $\theta_1$, a normal direction to the root faces 75 and 76 will be off of the direction 524 by that angle $\theta_1$. A direction 528 is normal to such a machined face. As-cast, however, the faces may be normal to the root sides and then machined at the angle $\theta_1$.

The frame 520 of FIG. 2 also includes exemplary crystalline directions along the root.

Figure 5:
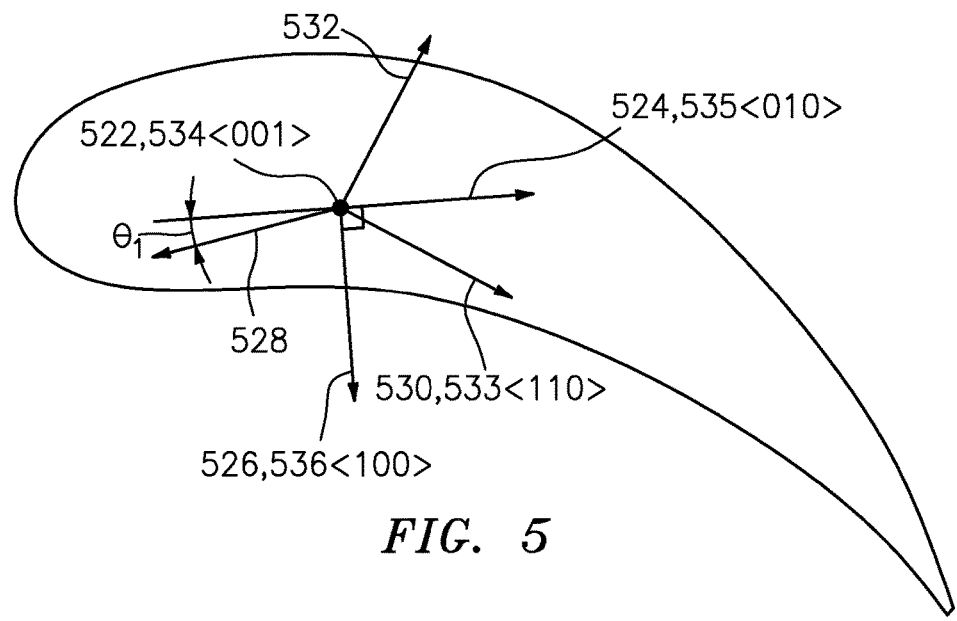
FIG. 5 is a schematic sectional view of a proximal portion of the blade of FIG. 2, taken along line 5-5.
Figure 6:
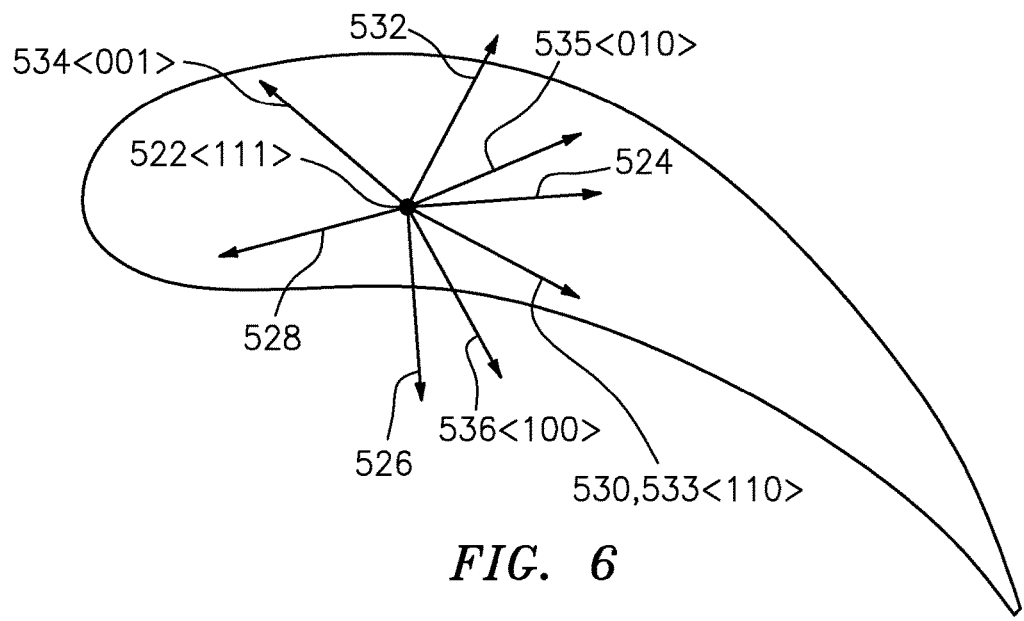
FIG. 6 is a schematic sectional view of a distal portion of the blade of FIG. 2, taken along line 6-6.

The sectional views of FIGS. 5 and 6 also show a chordwise direction 530 and a direction 532 normal thereto In a first exemplary implementation involving differing crystallographic orientations, the relatively proximal/rootward portion (e.g., section 82 of FIG. 2 or section 82-2 of FIG. 3) may share the crystalline orientation of the root and platform and have a high ductility (<001> for exemplary face centered cubic (FCC) alloy) axis aligned within 15° of the radial and/or spanwise direction 522 (more particularly within 5°) in order to best address thermal-mechanical fatigue from cyclical radial loading. Other cubic structures that have demonstrated epitaxial atomic growth are also relevant (e.g., simple cubic, body centered cubic, and hexagonal close packed).

Figure 7:
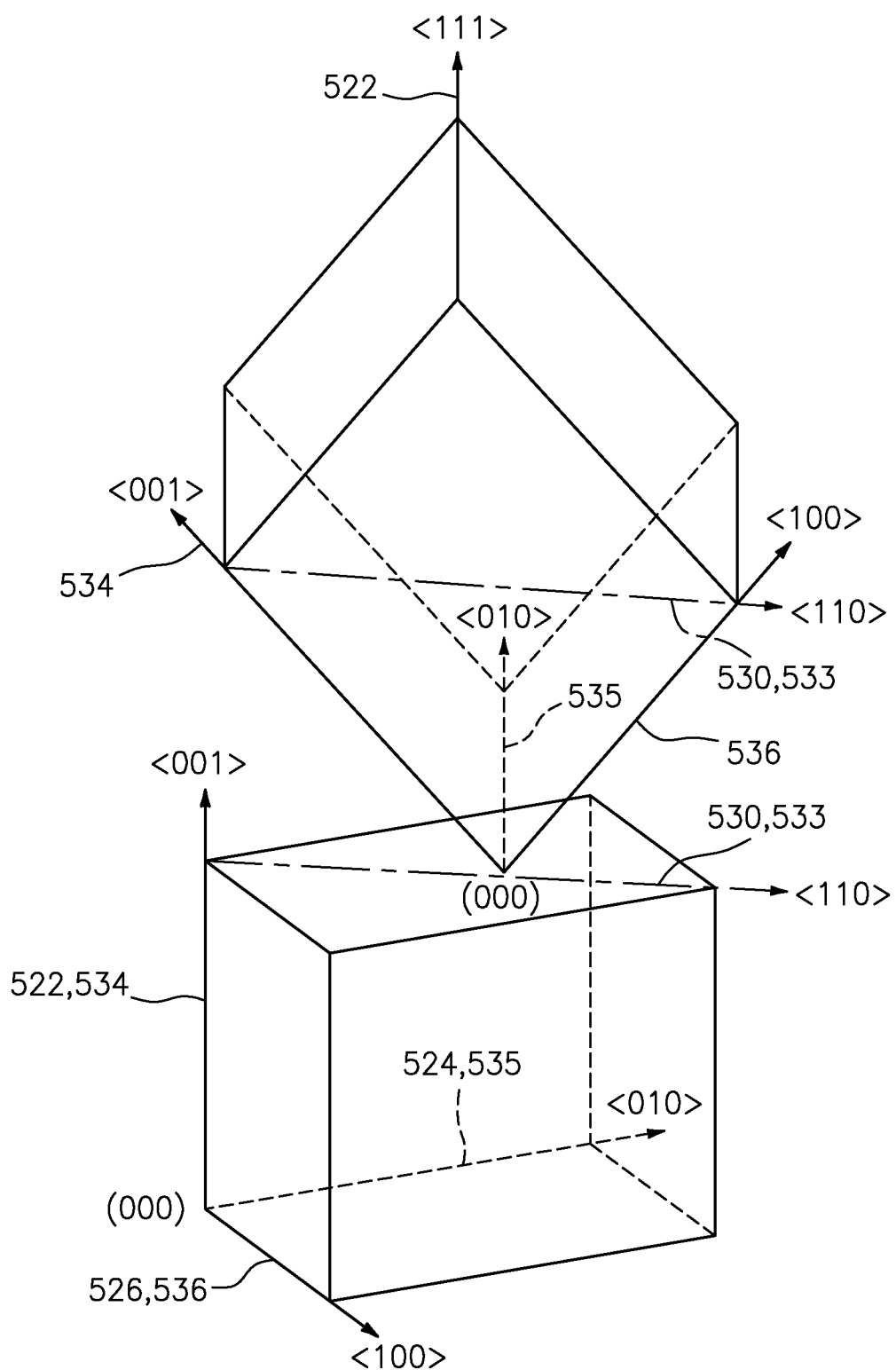
FIG. 7 is a schematic representation of crystalline orientations of the two zones of the blade of FIG. 2.

FIGS. 5 and 7 further show an <010> direction aligned with the axis 524, a <100> direction aligned with 526, and a <110> direction aligned with 530. These are arbitrarily chosen for reference in describing the different orientations of the different sections below. FIG. 5 further labels the <001> direction that is initially coincident with 522 as 534; the <010> direction initially coincident with 524 as 535; the <100> direction initially coincident with 526 as 536; and the <110> direction initially coincident with 530 as 533. As is discussed below in the tipward portion of the airfoil shown in FIG. 6, these respective crystallographic directions will be rotated out of registry with the physical geometric directions.

The orientation for the outboard/distal/tipward portion (e.g., 80 of FIG. 2 or 80-2 and/or 81 of FIG. 3) is to resist radial creep under centrifugal loading. Accordingly, for this purpose, the high rigidity (<111> in FCC alloys) axis is aligned within 15° of the radial and/or spanwise direction 522, more particularly within 10° or 5°. FIG. 6 is a schematic sectional view of the distal portion of the airfoil of the blade of FIG. 2, taken along line 6-6.

In this example, the <110> directions 533 of the two sections are in alignment or close thereto (e.g., within 15° of each other, more particularly within 10° or 5°). In the rootward portion, the <110> direction is out of alignment with the directions 524 and 526. In this embodiment, a <010> direction 535 is aligned with the direction 524 and a <100> direction 534 is aligned with 526. Such alignments may be within 15°, more particularly 10° or 5°. The shared alignment of at least one direction (e.g., the <110> direction 533 discussed above) helps improve bonding between the two sections by presenting similar atomic structure of the two regions at the interfaces.

Figure 8:
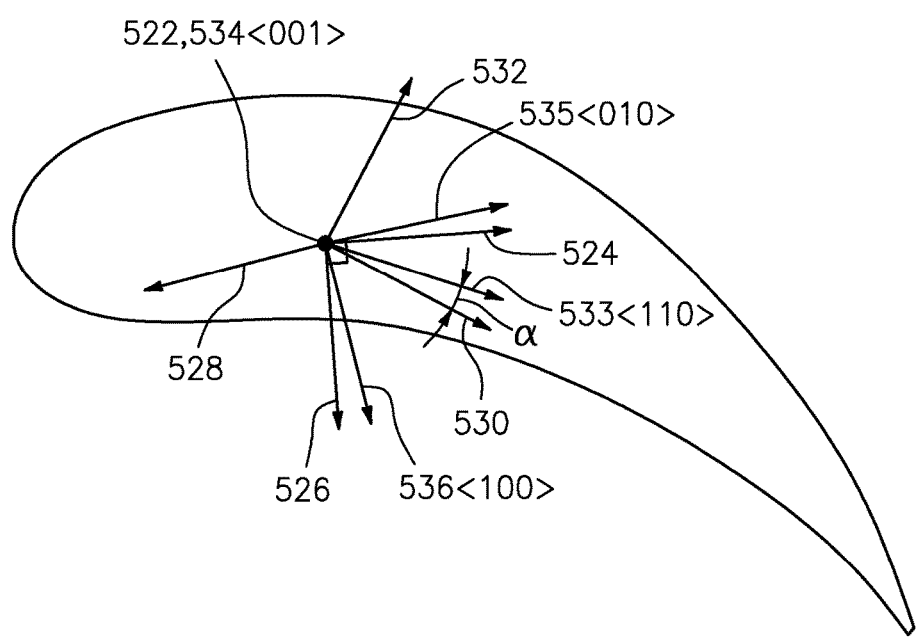
FIG. 8 is a schematic sectional view of a distal portion of the blade of FIG. 2, taken along line 6-6 but showing a first alternative crystalline orientation of an outboard zone.
Figure 9:
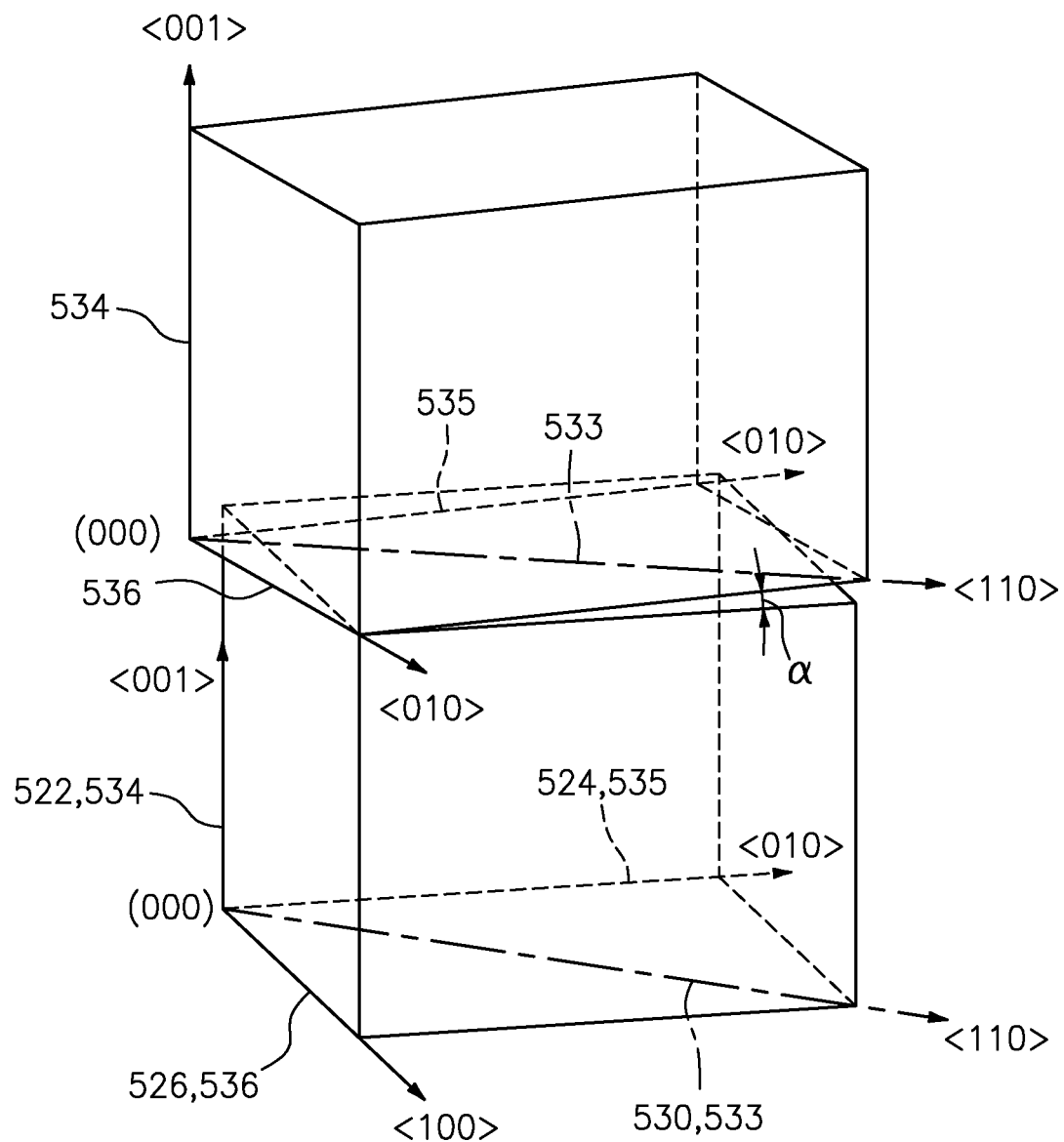
FIG. 9 is a schematic representation of crystalline orientations of the two zones of the blade of FIG. 2 including the first alternative crystalline orientation of the outboard zone.

FIGS. 8 and 9 show an alternative implementation wherein the rootward portion (root, platform, and proximal airfoil sections) have similar crystalline orientations to the first exemplary implementation. However, the crystalline orientation of the tipward section of the airfoil is altered so that a <001> direction 522 is aligned with the radial direction 522 (e.g., within 15°, more particularly within 10° or 5° or 2°). In this implementation, even though the primary orientation (shared <001> direction as the radial direction 522) is the same, the secondary orientations are relatively angularly offset from each other. In this example, they are rotated by an angle shown as α in FIG. 9. Exemplary α is 10-45°, more particularly, 15-45° or 30-45° but will depend upon physical conditions discussed below. The rotation may make use of several properties of the crystalline structure. In the crystalline lattice cube, the cube face planes have higher ductility. This may make it desirable to align this ductility with particular stresses. This may be used, in particular, to align the high ductility direction with high surface stress directions, thereby aligning high ductility direction close to parallel with the surface. Thus, for example, along the root, a plane of the cube may be parallel to the common plane of the radial direction 522 and the slot-wise or root-wise direction 524; whereas, along at least a portion of the airfoil the angle α may be chosen to better align such a plane with one or both of the pressure side and suction side at least along high tensile stress areas.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade comprising:
an airfoil; and
an attachment root,
wherein:
the blade has a tipward zone and a rootward zone; and
the rootward zone has a single crystal structure;
the tipward zone has a single crystal structure;
the crystalline orientations of the rootward zone and tipward zone are at least 15° out of registry with each other;
the tipward zone has a first crystalline direction within 15° of spanwise; and
the rootward zone has a second crystalline direction, different from the first crystalline direction, within 15° of spanwise.

2. The blade of claim 1 wherein:
the crystalline orientations of the rootward zone and tipward zone are at least 30° out of registry with each other.

3. The blade of claim 1 further comprising:
a transient liquid phase bond between the tipward zone and the rootward zone.

4. The blade of claim 3 wherein:
the tipward zone has a first composition; and
the rootward zone has a second composition, different from the first composition.

5. The blade of claim 1 wherein:
the first crystalline direction is a <111> direction; and
the second crystalline direction is a <001> direction.

6. The blade of claim 1 wherein:
the tipward zone is less dense than the rootward zone.

7. The blade of claim 1 wherein:
the tipward zone and the rootward zone have the same composition.

8. The blade of claim 1 wherein:
the tipward zone and the rootward zone have differing compositions.

9. The blade of claim 1 wherein:
the tipward zone and the rootward zone are nickel-based superalloy.

10. A blade comprising:
an airfoil; and
an attachment root,
wherein:
the blade has a tipward zone and a rootward zone; and
the rootward zone has a single crystal structure;
the tipward zone has a single crystal structure;
the crystalline orientations of the rootward zone and tipward zone are at least 15° out of registry with each other;
the tipward zone has a first crystalline direction within 15° of spanwise;
the rootward zone has said first crystalline direction within 15° of spanwise; and
at an interface between the tipward zone and the rootward zone, the crystal of the tipward zone is rotated around the spanwise direction by an angle of 15-45° relative to the crystal of the rootward zone.

11. The blade of claim 10 wherein:
the first crystalline direction is a <001> direction.

12. The blade of claim 10 further comprising:
a transient liquid phase bond between the tipward zone and the rootward zone.

13. The blade of claim 12 wherein:
the tipward zone is less dense than the rootward zone.

14. The blade of claim 12 wherein:
the tipward zone and the rootward zone have the same composition.

15. The blade of claim 10 wherein:
the tipward zone is less dense than the rootward zone.

16. The blade of claim 10 wherein:
the tipward zone and the rootward zone have the same composition.

17. A method for manufacturing a blade comprising:
an airfoil; and
an attachment root,
wherein:
the blade has a tipward zone and a rootward zone; and
the method comprises:
assembling a precursor of the tipward zone and a precursor of the rootward zone with a foil therebetween; and
heating the assembled precursors and foil to transient liquid phase bond the tipward zone and the rootward zone,
wherein:
the rootward zone has a single crystal structure;
the tipward zone has a single crystal structure;
the tipward zone has a <111> direction within 15° of spanwise; and
the rootward zone has a <001> direction within 15° of spanwise.

18. The method of claim 17 wherein:
the tipward zone is of a different alloy than the rootward zone.

19. The method of claim 17 wherein:
the tipward zone is of a less dense alloy than the rootward zone.

20. The method of claim 17 wherein:
a boundary between the tipward zone and the rootward zone is between −10% and 70% span of the airfoil.

21. The method of claim 17 wherein:
the foil has a by-weight concentration of a melting point depressant at least 1.0% greater than the precursor of the first zone and the precursor of the second zone.

22. The method of claim 21 wherein:
the precursor of the tipward zone and the precursor of the rootward zone are nickel-based superalloy; and
the melting point depressant is boron.

23. The method of claim 21 wherein:
the foil has a thickness of twenty micrometers to 100 micrometers.

* * * * *